(12) United States Patent
Heilper et al.

(10) Patent No.: US 7,264,163 B2
(45) Date of Patent: Sep. 4, 2007

(54) ON-LINE CORRECTION OF CHECK CODE LINE RECOGNITION IN POINT-OF-SALE STATIONS

(75) Inventors: Andre Heilper, Haifa (IL); Ehud Karnin, Koranit (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/030,532

(22) Filed: Jan. 6, 2005

(65) Prior Publication Data

US 2006/0144937 A1    Jul. 6, 2006

(51) Int. Cl.
*G06K 7/10* (2006.01)

(52) U.S. Cl. .................................. 235/454; 235/375

(58) Field of Classification Search .............. 235/454, 235/375, 380, 494
See application file for complete search history.

(56) References Cited

OTHER PUBLICATIONS

E. J. Keogh et al., "Derivative Dynamic Time Warping", http://www.cs.ucr.edu/~eamonn/sdm01.pdf.

*Primary Examiner*—Karl D. Frech

(57) ABSTRACT

Methods and systems are provided for check code line recognition at a point-of-sale terminal having OCR and MICR capabilities. Images of problematic characters are extracted and automatically transmitted to a remote location for on-line manual validation or data entry. Video coding of problematic characters is performed for the correction of either or both MICR and OCR results. The correctly encoded characters are returned to the point of sale within a few seconds, and combined as necessary with locally recognized characters, to assemble a correct code line for entry into a payment system.

18 Claims, 4 Drawing Sheets

ON-LINE CORRECTION OF CHECK CODE LINE RECOGNITION IN POINT-OF-SALE STATIONS

BACKGROUND OF THE INVENTION

1. Field of the Invention

This invention relates to document recognition. More particularly, this invention relates to methods and systems for the recognition of checks and similar payment instruments.

2. Description of the Related Art

Checks are a common means of payment, and are widely used in retail transactions. Thus, practically every modern store accepts them. In order to process a payment by check, some point-of-sale (POS) terminals are capable of capturing bank account information from the check at the time of purchase. This information is represented by indicia, typically located at the bottom of the check, and known as the code line, which includes the bank's transit number, the customer's bank account number, and the check sequence number. The indicia are readable visually, and are also readable automatically, using well-known optical character recognition (OCR) and magnetic ink character recognition (MICR) techniques.

Due to ink imperfections, even state-of-the-art magnetic readers suffer from significant numbers of misreads—both character substitution errors (over 0.1%) and errors due to unreadable characters (up to 4%). In order to mitigate this problem, MICR may be augmented by OCR. Nevertheless, a significant number of checks are still rejected by automatic recognition systems. These checks must be manually entered into the POS terminal for submission to the payment system, during which, for reasons of security, a cashier keying in the code line information is typically supervised by a store manager. Since code lines tend to be quite long (25-40 characters), manual data entry is tedious and error prone. It is costly in terms of labor, and diverts the manager from other functions. Furthermore, rejection of a customer's check by the automatic recognition system is inconvenient not only to that customer, but also to other customers waiting to be serviced by the cashier. Resultant loss of good will can be significant to the merchant.

SUMMARY OF THE INVENTION

According to disclosed embodiments of the invention, an improved solution is provided to achieve rapid and reliable check code line recognition at a point-of-sale terminal. Problematic characters are automatically recognized as such. Images of the problematic characters are extracted and automatically transmitted to a remote location for on-line validation or manual data entry. This technique may be used to code problematic characters for the correction of either or both MICR and OCR results. The correctly encoded characters are returned to the point-of-sale terminal within a few seconds and combined as necessary with locally recognized characters. An indication of satisfactory code line recognition is then presented to the cashier. High quality character recognition is thus achieved in real-time, and annoying delays for shoppers are avoided. Advantages of some aspects of the present invention include saving of store personnel time, reduced delays for customers, and increased customer satisfaction. Detection of errors at the point of sale also reduces administrative costs. Furthermore, security of the transaction is enhanced, as any manual data entry is performed by someone other than the cashier.

In the event the code line cannot be identified within a predetermined time limit using remote character recognition, or if remote character recognition is unavailable altogether, in alternate embodiments of the invention the code line may be displayed at the POS terminal, with problematic characters highlighted. Alternatives are proposed to the cashier by an appropriate display near each of the problematic characters. The cashier may select from among the proposed alternatives in order to correctly identify the problematic character. Because the cashier has a limited ability to modify the code line, there is no need for a management person to supervise the operation. Alternatively, the cashier may be allowed to freely encode the problematic characters, but not other characters. Even here, the risk of fraud is negligible, and the supervisor's presence is generally not required.

The invention provides a method of identifying a certificate at a point-of-sale terminal. Characters in a code line of the certificate are represented by at least human-readable indicia. The method is carried out by conducting a first type of automatic character recognition on at least a first portion of the indicia at the point-of-sale terminal, conducting a second type of automatic character recognition on at least a second portion of the indicia at the point-of-sale terminal, and thereby identifying at least one unrecognized character of the code line. The method is further carried out by generating an image at the point-of-sale terminal of the human readable indicia that correspond to the unrecognized character, communicating the image to a remote human evaluator for identification of the unrecognized character, and returning an identified character to the point-of-sale terminal, typically within less than ten seconds of conducting the automatic character recognition, replacing the unrecognized character with the identified character to form an identified code line, and communicating the identified code line to a payment system.

According to an aspect of the method, the first type of automatic character recognition is optical character recognition, and the second type of automatic character recognition is magnetic ink character recognition.

In a further aspect of the method, prior to communicating the image, it is automatically determined whether the unrecognized character is able to be identified by the human evaluator.

Another aspect of the method includes proposing possible identities for the unrecognized character. Then, responsively to an automatic determination that the unrecognized character is unable to be identified by the human evaluator, the unrecognized character and the possible identities are displayed, enabling a human operator to modify the unrecognized character.

According to one aspect of the method, the human operator is allowed to modify the unrecognized character only by selecting one of the possible identities.

The invention provides a computer software product, including a computer-readable medium in which computer program instructions are stored, which instructions, when read by a computer, cause the computer to perform a method of identifying a certificate at a point-of-sale terminal. Characters in a code line of the certificate are represented by at least human-readable indicia. The method is carried out by conducting a first type of automatic character recognition on at least a first portion of the indicia at the point-of-sale terminal, conducting a second type of automatic character recognition on at least a second portion of the indicia at the point-of-sale terminal, and thereby identifying at least one unrecognized character of the code line. The method is further carried out by generating an image of the human readable indicia that correspond to the unrecognized character at the point-of-sale terminal, communicating the image to a remote human evaluator for identification of the unrecognized character, and returning the identified character to the point-of-sale terminal, replacing the unrecognized character with the identified character to form an identified code line, and communicating the identified code line to a payment system.

The invention provides a point-of-sale terminal of identifying a certificate, on which characters of a code line are represented by indicia, at least a portion of which are human-readable, including a first reader for conducting a first type of automatic character recognition on the indicia, a second reader for conducting a second type of automatic character recognition on the indicia, an arbitration module operative in real-time responsively to the first reader and the second reader for identifying at least one unrecognized character of the code line, an imager for generating an image of at least one of the human readable indicia that corresponds to the unrecognized character, and a communication facility linked to a remote human evaluator for identification of the unrecognized character on the image by the human evaluator, wherein the point-of-sale terminal is operative to accept the identified character, to replace the unrecognized character with the identified character to form an identified code line, and to communicate the identified code line to a payment system via the communication facility.

According to one aspect of the point-of-sale terminal, the first reader is an optical character reader and the second reader is a magnetic ink character reader.

According to another aspect of the point-of-sale terminal, decisional logic is included for automatically determining whether the unrecognized character can be identified by the human evaluator.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

SYSTEM OVERVIEW

Figure 1:
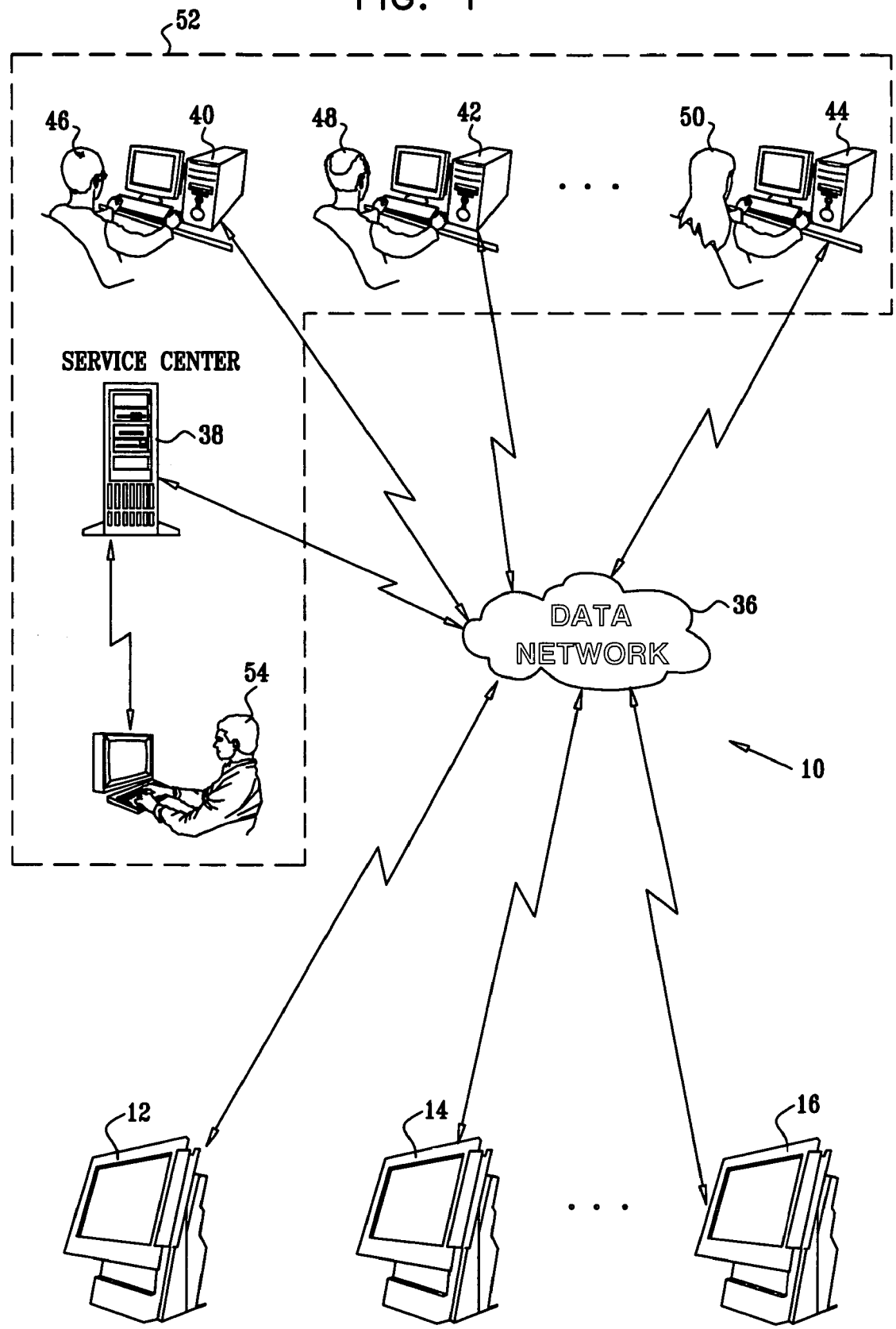
FIG. 1 is a schematic of a system that is constructed and operative in accordance with a disclosed embodiment of the invention.

Turning now to the drawings, reference is initially made to FIG. 1, which schematically illustrates a system 10 that is constructed and operative in accordance with a disclosed embodiment of the invention. A plurality of point-of-sale terminals 12, 14, 16 have check reading capabilities and receive customer checks.

The point-of-sale terminals 12, 14, 16 are capable of reading the code lines of conventional checks, or other certificates, which consist of magnetic ink characters that are both human-readable and machine-readable. However, the invention is applicable to documents having other types of machine-readable indicia, e.g., bar codes or other forms of encrypted characters. It is only necessary that there be at least two types of machine-readable indicia, one of which is also readable by humans, and that the code line characters represented by different types of indicia can be spatially correlated.

Figure 2:
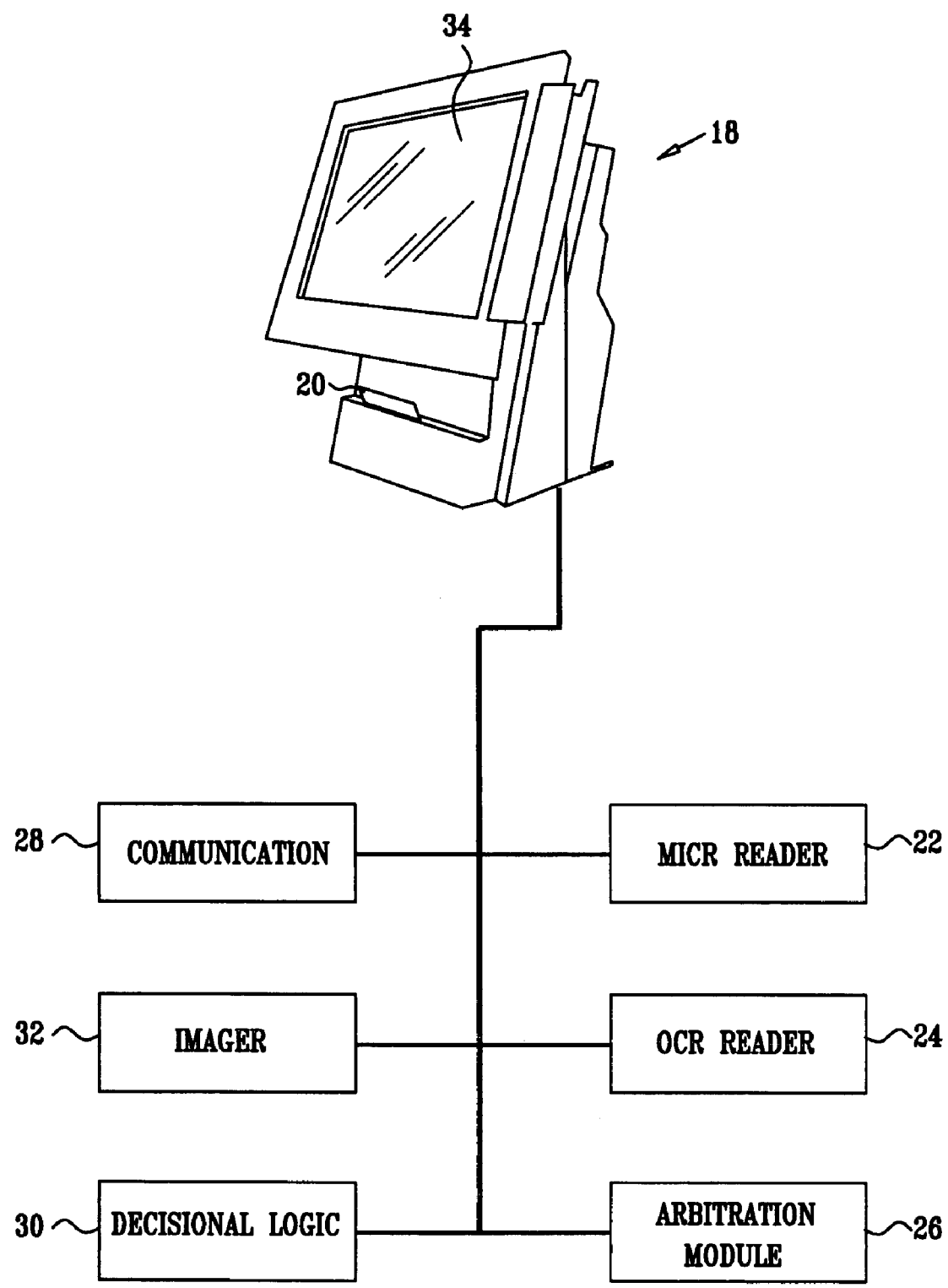
FIG. 2 is a detailed block diagram of a point-of-sale terminal in the system shown in FIG. 1.

Reference is now made to FIG. 2, which is a detailed block diagram of a point-of-sale terminal 18 that is suitable for use as the point-of-sale terminals 12, 14, 16 (FIG. 1). The terminal 18 has a document input slot 20 for accepting checks to be identified. The checks are read by an OCR reader 22 and a MICR reader 24. The point-of-sale terminal 18 is furnished with an arbitration module 26 for registering concurrence or non-concurrence of the OCR and MICR readers, and has a conventional data communication facility 28. Decisional logic 30 is present, which is capable of determining whether problematic characters should or should not be submitted to a remote human evaluator in accordance with predefined criteria, for example, whether a response can be expected in a given time, or the characteristics of the problematic character. The decisional logic 30 may be realized as a computer program, or may be implemented in hardware, for example as an ASIC. An imager 32 is capable of generating a digital image of any specified optically readable indicia in the code line. The point-of-sale terminal 18 is furnished with a display 34 that provides an interface for the cashier. The point-of-sale terminal 18 can be the model 4694 SurPos™ point-of-sale terminal, attached to a model TI-8 SureMark™ printer, both of which are available from International Business Machines Corporation, New Orchard Road, Armonk, N.Y. 10504.

Referring again to FIG. 1, three point-of-sale terminals are shown representatively. However, the system 10 can operate with any number of point-of-sale terminals, located in the same or different retail establishments in many combinations. The point-of-sale terminals 12, 14, 16 are connected by known methods to a data network 36, which can be a private network, or the Internet. Indeed, the point-of-sale terminals could have worldwide distribution and can operate concurrently.

A server 38 is linked to the data network 36. Its function is to receive images of the optical indicia that correspond to problematic characters from the point-of-sale terminals 12, 14, 16, and to distribute the images to one or more service terminals 40, 42, 44, which are operated by human evaluators 46, 48, 50, respectively. In FIG. 1, the service terminals 40, 42, 44 are linked directly to the data network 36. This arrangement is merely exemplary. The service terminals 40, 42, 44 can be connected directly to the server 38, linked to the server 38 via intermediate servers (not shown), or linked to the server 38 via a different data network (not shown). Many possibilities will occur to those skilled in the networking art. The server 38 distributes images of problematic characters to the service terminals 40, 42, 44 for manual interpretation by the human evaluators 46, 48, 50. The correctly identified versions of the problematic characters are returned to the point-of-sale terminals 12, 14, 16 and are combined with the recognized characters, typically as a string of characters. The resulting information is then submitted to a payment system, where it may be used to authenticate the check or other payment certificate.

The server 38 and the human evaluators 46, 48, 50 may be co-located in a service center 52. Alternatively, they could be remotely located and interlinked via the data network 36 or another data network (not shown). It may be desirable to geographically distribute the human evaluators 46, 48, 50 in order to more easily support a worldwide client base of retailers. Dispersing the human evaluators 46, 48, 50 has further advantages to an administrator 54 of the service center 52, including securing human evaluators from countries having a favorable labor market, and located in time zones convenient to support the clients of the service center 52 during normal working hours. It is a collateral advantage of some aspects of the invention, that the owner of the service center 52 could be credited with promoting governmental conservation policies, should the human evaluators 46, 48, 50 remain at home and telecommute to the service center 52. The service center 52 could be integral within a retail chain organization. Alternatively, the service center 52 could be an outsourced operation that could support many retail chains.

The number of human operators in the service center 52 is application dependent. In some cases, only one human evaluator suffices, although the capabilities of the system would then be somewhat limited. In other cases, many human evaluators will be needed to handle workload and to replicate problematic character recognition in order to increase reliability.

OPERATION

Figure 3:
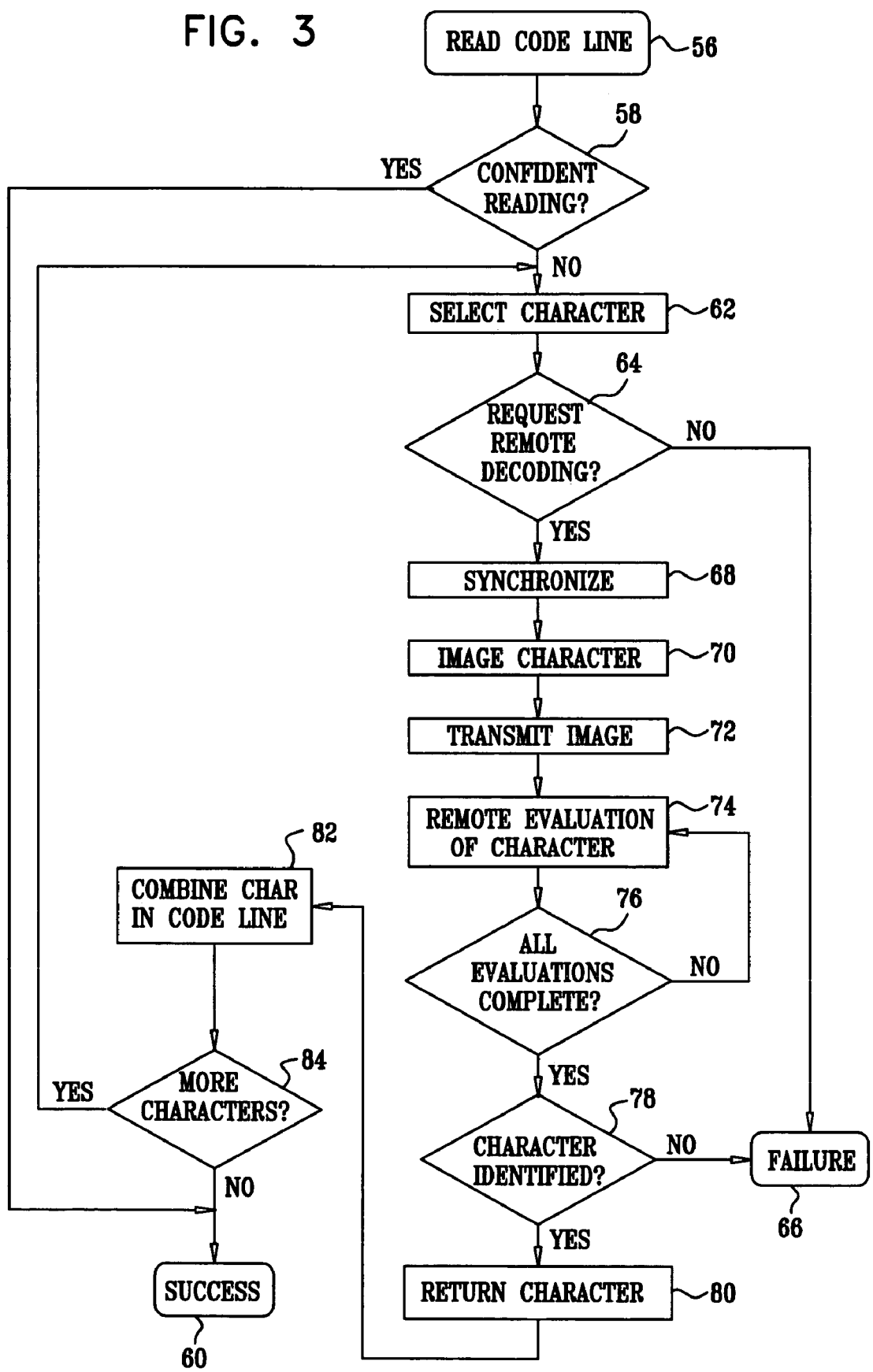
FIG. 3 is a flow chart illustrating a method of encoding a code line of a check in accordance with a disclosed embodiment of the invention.

Reference is now made to FIG. 3, which is a flow chart illustrating a method of encoding a code line of a check in accordance with a disclosed embodiment of the invention. It is to be emphasized that the following procedure is performed on line in real-time, which means, in the context of the present patent application, that the procedure is performed while the customer is awaiting service by a cashier operating a POS terminal. Thus, results must be available within a few seconds. Preferably, the results are available within five seconds, assuming that the service center is realistically staffed for less-than-peak workloads. Optimally, however, it can be seen from the example presented hereinbelow, assuming 1.5 problematic characters/check and a remote evaluator productivity of 10,000 characters/hour, 0.5 sec is needed for data entry per check. Assuming another 1.5 seconds for communication delay, in an optimal mode, results can arrive at the originating POS terminal after a delay of two seconds during periods of low workload.

The steps of the method are shown in a particular sequence in FIG. 3 for clarity of presentation. However, it will be evident to those skilled in the art that many of them can be performed in parallel, asynchronously, or in different orders.

The process begins at initial step 56, in which a customer submits a check in payment for goods or services to a cashier, who enters the check into a POS terminal. The POS terminal attempts to read the check's code line using two different recognition engines, typically MICR and OCR engines. In some embodiments, a confidence level is associated with an identification, or tentative identification of each character.

Control now proceeds to decision step 58, where it is determined if a confident reading of the all characters of the code line was obtained. Various governing policies are possible in order to make this determination. For example, according to one policy, the determination would be affirmative if a confident reading can be made by either one of the MICR or the OCR techniques, even if the other technique did not result in a confident reading. In other applications, the recognition engines vote on each character, and agreement between the two techniques may be required on a character-by-character basis. The latter alternative results in a larger number of problematic characters, but the reliability of confident readings is greater. In some embodiments, multiple unsuccessful attempts at automatic character recognition may be required, using both MICR and OCR, before a negative determination is made in decision step 58.

If the determination at decision step 58 is affirmative, then control proceeds to final step 60 and the procedure ends successfully.

If the determination at decision step 58 is negative, then control proceeds to step 62. A problematic character of the code line is chosen for further processing.

Next, at decision step 64, a determination is made whether to request remote identification of the current problematic character. One criterion for this determination is whether results can be expected within a predetermined time interval. In some embodiments, the POS terminal may have been able to make a tentative identification of the character, and a metric regarding the confidence level of the tentative identification may be associated with the current problematic character. In other cases, the character may not be identifiable by the recognition engines. Even here, a metric, indicating deviation from a possible character or group of characters may accompany the image. In some cases, the character may be missing, or may be so distorted as to make even human recognition unlikely. Such characters need not be sent for remote identification, as this would be futile. In other embodiments, metrics may not be available, and all problematic characters would be automatically submitted for remote identification.

If the determination at decision step 64 is negative, then control proceeds to final step 66. The procedure ends in failure, and conventional check processing will be required. Alternatively, the check may be utterly rejected as defective.

If the determination at decision step 64 is affirmative, then control proceeds to step 68. A synchronization procedure is undertaken in order to spatially correlate the magnetic signal with the optical scan and thereby identify the location of the current problematic character on the check. Synchronization can be achieved using an implementation of the dynamic time warping algorithm. This algorithm is well known, for example from the document *Derivative Dynamic Time Warping*, Keogh, E. J., and Pazzani, M. J., which is herein incorporated by reference. Upon completion of step 68, the precise location on the check of the human-readable version of the current problematic character is known, regardless of whether the problem in reading the character is due to a flaw in the magnetic medium or difficulties in optical recognition.

Next, at step 70 an optical image of the current problematic character is prepared.

Next, at step 72 the image of the current problematic character is transmitted to one or more remote human evaluators for manual identification. Preferably, one or more images are grouped and presented in a manner that is convenient for data entry. For example, the human evaluator might operate efficiently if several characters from the same or different checks were grouped together.

Next, at step 74, the image of the current problematic character is evaluated by one or more remote human evaluators, and an identification made. In some cases, this is simply a validation of the tentative identification of the POS terminal. In other cases, data entry by the human operator of the correct character is required.

In still other cases, when the confidence level is low, or when no definite identification could be made, the character may be automatically routed to more than one human evaluator, each of whom makes an independent identification. In such cases, only if the human evaluators agree is a definitive identification of the problematic character considered to have been achieved. Agreement may be defined by a governing policy. For example, unanimity of the human evaluators may be required. Alternatively, agreement could be registered by concurrence of a majority, or some supermajority when there are three or more human evaluators attempting to identify the current problematic character. If the image of the current problematic character were submitted to five different humans, concurrence of three of them might suffice to identify the character. Alternatively, concurrence of four of five human evaluators could be required. Many policies and combinations are possible at this step. Determination of how many humans are to attempt to evaluate the problematic character can be made automatically, based on the confidence characteristics of the tentative identification at the POS terminal. Distribution of the image of the current problematic character to the human evaluators and registration of their input is typically performed by a server having suitable voting and arbitration programs.

Next, at delay step 76, input from all applicable human evaluators is awaited.

Control next proceeds to decision step 78, where it is determined if a definitive identification was made, in accordance with the governing policy, as described above If the determination at decision step 78 is negative, then control proceeds to final step 66 and the procedure ends in failure. Failure to identify is indicated to the originating POS terminal.

If the determination at decision step 78 is affirmative, then control proceeds to step 80. The character is returned to the originating POS terminal.

Next, at step 82, the newly identified character replaces the problematic character in the code line reading.

Control now proceeds to decision step 84, where it is determined if more problematic characters are present in the code line of the current check. If the determination at decision step 84 is affirmative, then control returns to step 62.

If the determination at decision step 84 is negative, then control proceeds to final step 60. The procedure terminates successfully. The identified characters are communicated to a payment system.

EXAMPLE

The economic benefit of the invention can be appreciated by a consideration of the following example. Assume that the service center 52 (FIG. 1) services a number of retail chains having an aggregate daily volume of 10 million checks. Furthermore, assume that 4% of the checks are rejected during a first reading attempt at the POS terminals, and 1% (100,000 checks) remain unread after two or more attempts. If all the rejected checks were entered into the system manually, with an estimated average processing time of two minutes (120 seconds) per check, the time required for entry would be:

$$10,000,000*0.01*120=12,000,000 \text{ seconds per day.}$$

A dedicated operator of a POS terminal provides, at most, 8 hours (or 28,800 seconds)/shift of work. Thus, the above the check processing time translates into full time equivalents (FTE) as follows.

$$12,000,000/28,800=417 \text{ FTE.}$$

This FTE requirement is actually a low estimate, as it ignores time required by a supervisory person to observe the manual entry and nonproductive time of the cashier. Assuming that the fully loaded annual cost of a cashier is about $30,000, the total cost attributable to unreadable checks is calculated as $$417*30,000=12,510,000,$$

or approximately 12.5 million dollars. In contrast, utilizing the inventive technique, it is necessary to provide remote data identification and data entry for 100,000 problematic checks. Assuming an average of 1.5 problematic characters per check, it is necessary to remotely identify and enter 150,000 characters per day. Since all the problematic characters would be extracted and presented to the remote data entry operators at the service center in the most convenient manner, we can assume that productivity rates would be as high as 10,000 characters/hour or 80,000 characters for a 8 hour shift. Thus, fewer than two FTE are required to handle this workload:

$$150,000/80000=1.875 \text{ FTE.}$$

Assuming, once more, that the fully loaded operator cost is $30,000 per year, the total annual check handling cost is calculated at $60,000. This cost is less than 0.5% of the costs that would be incurred by the retail chains using conventional check handling methods.

ALTERNATE EMBODIDMENT

In this embodiment, it is assumed that the method disclosed above with reference to FIG. 3 has been performed, and the procedure ended in failure (final step 66), thereby necessitating intervention by the human operator (cashier) of the POS terminal. It will be recalled that conventionally in such an event, the cashier would key in the check line data, supervised as described above.

Figure 4:
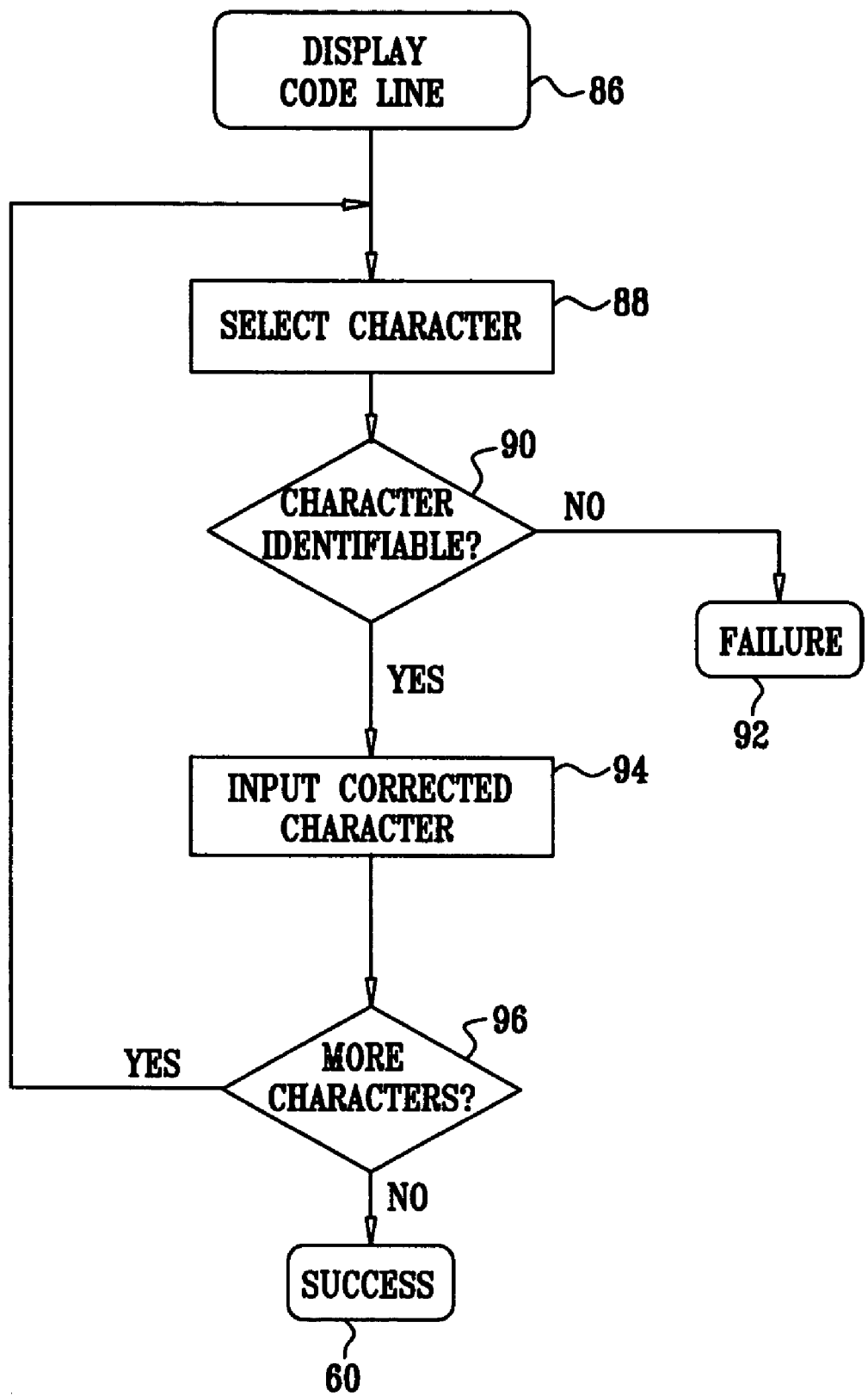
FIG. 4 is a flow chart describing an alternate embodiment of method of encoding a code line of a check in accordance with a disclosed embodiment of the invention.

Reference is now made to FIG. 4, which is a flow chart describing an alternate embodiment of a method of encoding a code line of a check in accordance with a disclosed embodiment of the invention. The method is typically performed by the cashier operating the POS terminal, and can be performed using the system 10 (FIG. 1).

The procedure begins at initial step 86. It is assumed that a current check has been unsuccessfully processed by a POS terminal, and that remote encoding failed. Alternatively, remote encoding may have became unavailable, possibly due to hardware or communications failure, system overload, or unavailability of human evaluators. A display of the characters of the check's code line, with the problematic characters highlighted, is presented to the cashier. Also displayed are alternative character identifications proposed by the automatic recognition engines of the POS terminal, which are shown near the highlighted problematic characters. Preferably, the number of proposed alternatives should vary from 1 to 5. Most preferably, there are at least two proposed alternatives.

Next, at step 88 a problematic character is manually selected.

Control now proceeds to decision step 90, where it is determined if the problematic character can be identified by the cashier. In some embodiments, the cashier is limited to selecting one of the proposed alternatives. In these embodiments, the presence of a supervisor is unnecessary, as there is virtually no possibility of entering fraudulent data. In other embodiments, the cashier may be allowed to input a corrected character freely. Even in these embodiments, a supervisor may not be needed, as meaningful fraudulent data is unlikely to be entered. Authorization for the cashier to freely encode data can be granted or denied automatically, based on the number and pattern of the problematic characters. For example, if the bank transit number were read successfully by the recognition engines, but an entire customer account number were problematic, it would be prudent to deny authorization for the cashier to enter corrected characters.

If the determination at decision step 90 is negative, then control proceeds to final step 92. The procedure ends in failure.

If the determination at decision step 90 is affirmative, then control proceeds to step 94. The cashier selects or keys in the correct character.

Control now proceeds to decision step 96, where it is determined if more problematic characters in the code line remain to be processed. If the determination at decision step 96 is affirmative, then control returns to step 88.

If the determination at decision step 96 is negative, then control proceeds to final step 98. The procedure terminates successfully.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of identifying a certificate at a point-of-sale terminal, said certificate having a code line of characters, said characters being represented by at least human-readable indicia, comprising the steps of:

conducting a first type of automatic character recognition on at least a first portion of said indicia at said point-of-sale terminal;

conducting a second type of automatic character recognition on at least a second portion of said indicia at said point-of-sale terminal;

responsively to said steps of conducting a first type of automatic character recognition and conducting a second type of automatic character recognition identifying at least one unrecognized character of said code line;

generating an image of at least one of said human readable indicia that corresponds to said unrecognized character at said point-of-sale terminal;

communicating said image to a remote human evaluator for identification of said unrecognized character by said human evaluator to define an identified character;

returning said identified character to said point-of-sale terminal;

replacing said unrecognized character with said identified character to form an identified code line; and communicating said identified code line to a payment system.

2. The method according to claim 1, wherein returning said identified character comprises returning said identified character within a time interval that does not exceed 10 seconds from completion of said steps of conducting a first type of automatic character recognition and conducting a second type of automatic character recognition.

3. The method according to claim 1, wherein said first type of automatic character recognition is optical character recognition and said second type of automatic character recognition is magnetic ink character recognition.

4. The method according to claim 1, further comprising the step of prior to performing said step of communicating said image automatically determining whether said unrecognized character is able to be identified by said human evaluator.

5. The method according to claim 4, further comprising the steps of:

proposing possible identities for said unrecognized character;

responsively to a determination in said step of automatically determining that said unrecognized character is unable to be identified by said human evaluator, displaying said unrecognized character and said possible identities; and enabling a human operator to modify said unrecognized character.

6. The method according to claim 5, wherein said human operator is allowed to modify said unrecognized character only by selecting one of said possible identities.

7. A computer software product, including a computer-readable medium in which computer program instructions are stored, which instructions, when read by a computer, cause the computer to perform a method for identifying a certificate at a point-of-sale terminal, said certificate having a code line of characters, said characters being represented by indicia, at least a portion of said indicia being human-readable, comprising the steps of:

conducting a first type of automatic character recognition on at least a first portion of said indicia at said point-of-sale terminal;

conducting a second type of automatic character recognition on at least a second portion of said indicia at said point-of-sale terminal;

responsively to said steps of conducting a first type of automatic character recognition and conducting a second type of automatic character recognition identifying at least one unrecognized character of said code line;

generating an image of at least one of said human readable indicia that corresponds to said unrecognized character at said point-of-sale terminal;

communicating said image to a remote human evaluator for identification of said unrecognized character by said human evaluator to define an identified character;

returning said identified character to said point-of-sale terminal;

replacing said unrecognized character with said identified character to form an identified code line; and communicating said identified code line to a payment system.

8. The computer software product according to claim 7, wherein said identified character is returned to said point of sale terminal within a time interval that does not exceed 10 seconds from completion of said steps of conducting a first type of automatic character recognition and conducting a second type of automatic character recognition.

9. The computer software product according to claim 7, wherein said first type of automatic character recognition is optical character recognition and said second type of automatic character recognition is magnetic ink character recognition.

10. The computer software product according to claim 7, wherein the computer is further instructed to perform the step of prior to performing said step of communicating said image automatically determining that said unrecognized character is able to be identified by said human evaluator.

11. The computer software product according to claim 7, wherein said unrecognized character is determined to be unrecognized responsively to an absence of concurrence of results obtained in said steps of conducting a first type of automatic character recognition and conducting a second type of automatic character recognition.

12. A point-of-sale terminal of identifying a certificate, said certificate having a code line of characters, said characters being represented being represented by indicia, at least a portion of said indicia being human-readable, comprising:

a first reader for conducting a first type of automatic character recognition on said indicia;

a second reader for conducting a second type of automatic character recognition on said indicia;

an arbitration module operative in real-time responsively to said first reader and said second reader for identifying at least one unrecognized character of said code line;

an imager for producing an image of at least one of said indicia that corresponds to said unrecognized character; and a communication facility linked to a remote human evaluator for identification of said unrecognized character by said human evaluator on said image to define an identified character; wherein said point-of-sale terminal is operative to accept said identified character, to replace said unrecognized character with said identified character to form an identified code line, and to communicate said identified code line to a payment system via said communication facility.

13. The point-of-sale terminal according to claim 12, wherein said first reader is an optical character reader and said second reader is a magnetic ink character reader.

14. The point-of-sale terminal according to claim 12, further decisional logic for automatically determining that said unrecognized character is able to be identified by said human evaluator.

15. The point-of-sale terminal according to claim 12, wherein said unrecognized character is unable to be recognized by said first reader.

16. The point-of-sale terminal according to claim 12, wherein said unrecognized character is determined to be unrecognized responsively to non-concurrence of results obtained from said first reader and said second reader.

17. The point-of-sale terminal according to claim 12, wherein said first reader and said second reader are adapted for proposing possible identities for said unrecognized character, further comprising:

a display, wherein in an event that said unrecognized character is determined to be unable to be identified by said human evaluator, said unrecognized character and said possible identities are output to said display; and said point-of-sale terminal is operative for enabling a human operator to modify said unrecognized character.

18. The point-of-sale terminal according to claim 17, wherein said human operator is allowed to modify said unrecognized character only by selecting one of said possible identities.

* * * * *